(12) United States Patent
Johnson

(10) Patent No.: US 6,731,688 B1
(45) Date of Patent: May 4, 2004

(54) SPEED SIGNALING FOR DATA COMMUNICATIONS

(75) Inventor: Luke A. Johnson, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/459,274

(22) Filed: Dec. 13, 1999

(51) Int. Cl.[7] .................................................. H04B 3/50
(52) U.S. Cl. ....................... 375/257; 375/288; 375/219; 370/468; 709/233
(58) Field of Search ................................ 375/219, 220, 375/222, 224, 225, 288, 259, 257, 258; 370/468

(56) References Cited

U.S. PATENT DOCUMENTS

| | | | | |
|---|---|---|---|---|
| 4,789,983 A | * | 12/1988 | Acampora et al. | .......... 370/333 |
| 4,924,456 A | * | 5/1990 | Maxwell et al. | .......... 370/296 |
| 5,533,054 A | * | 7/1996 | DeAndrea et al. | .......... 375/286 |
| 5,706,428 A | * | 1/1998 | Boer et al. | .......... 370/342 |
| 5,914,959 A | * | 6/1999 | Marchetto et al. | .......... 370/468 |
| 6,144,464 A | * | 11/2000 | Rupp et al. | .......... 358/442 |
| 6,212,240 B1 | * | 4/2001 | Scheibel et al. | .......... 370/468 |
| 6,330,278 B1 | * | 12/2001 | Masters et al. | .......... 101/350.3 |

* cited by examiner

Primary Examiner—Amanda T. Le
(74) Attorney, Agent, or Firm—Trop, Pruner & Hu, P.C.

(57) ABSTRACT

Communications between a host and a peripheral may be initiated by the peripheral transmitting data at the highest support data rate to the host. If the host is able to recognize the data, the host can so indicate to the peripheral. Otherwise, the peripheral may try a lower data rate progressively decreasing the data rate until the best possible data rate is identified under current conditions. In this way, a communication link may be established in a relatively straightforward fashion that is optimal for the given current conditions.

16 Claims, 4 Drawing Sheets

SPEED SIGNALING FOR DATA COMMUNICATIONS

BACKGROUND

This invention relates generally to data communications and particularly to providing relatively high speed serial communications between a receiver and a transmitter.

A variety of techniques exist for enabling a receiver and a transmitter to settle on a data communication rate between the two devices. For example, in technology currently used with 56K telephone modems, the transmitter starts at a lower data rate which is guaranteed by an applicable specification to be acceptable to the receiver. After communications have been initiated, the transmitter may step up the data rate if possible. Similarly, if in the course of data communications the receiver begins to perceive that the error rate is too high, the receiver may request that the transmitter lower the data rate. In this situation, the data communications are established at a relatively lower speed rate and then, in the course of communications, the rate may be increased or decreased.

One problem that arises in establishing the desired data rate is that prior to the establishment of the communication channel, the available communications between the receiver and the transmitter are particularly limited. This means that the receiver is unable to provide very much information to the transmitter about its ability to handle the data being provided by the transmitter until after communications have been established. This may explain why the protocol described above in connection with 56K telephone modems is utilized.

Another problem that arises in establishing the data communication rates between a transmitter and a receiver is that while the devices may have a nominal or specification data transmission rate, particular circumstances may arise at any given point in time that may change the ability of the devices to proceed at the nominal rate. For example, the receiver may be experiencing considerable line delays at a particular point in time because of operations going on at the receiver. Similarly, other conditions may affect the ability to communicate at the nominal rate. Existing techniques generally set a desired rate and only adjust that rate if, after communications have been established, it is determined that the error rate is unbearably high. Of course, this is the situation of "too little, too late" because the communications have already been impaired.

Thus, it would be desirable to have a communication protocol which enables communications to proceed at the highest possible rate as soon as possible and which accounts for the conditions which may exist at any given point in time when a communication is being initiated.

SUMMARY

In accordance with one embodiment of the present invention, a method includes transmitting a predetermined data pattern to a receiver at a first data rate. If the receiver does not recognize the pattern, the pattern is transmitted at a second data rate that is lower than the first data rate.

Other aspects and advantages are set forth in the accompanying detailed description and claims.

DETAILED DESCRIPTION

To enable high speed serial communications that are backward compatible with previous generations, speed information may be conveyed between a host and a peripheral before the communication channel has been established. An optimal data rate may be negotiated upon power up or other event without additional circuitry on the analog front end (AFE). The optimal data rate may be the maximum data rate that both the host and peripheral support at a given instance in time in the current environment.

Figure 1:
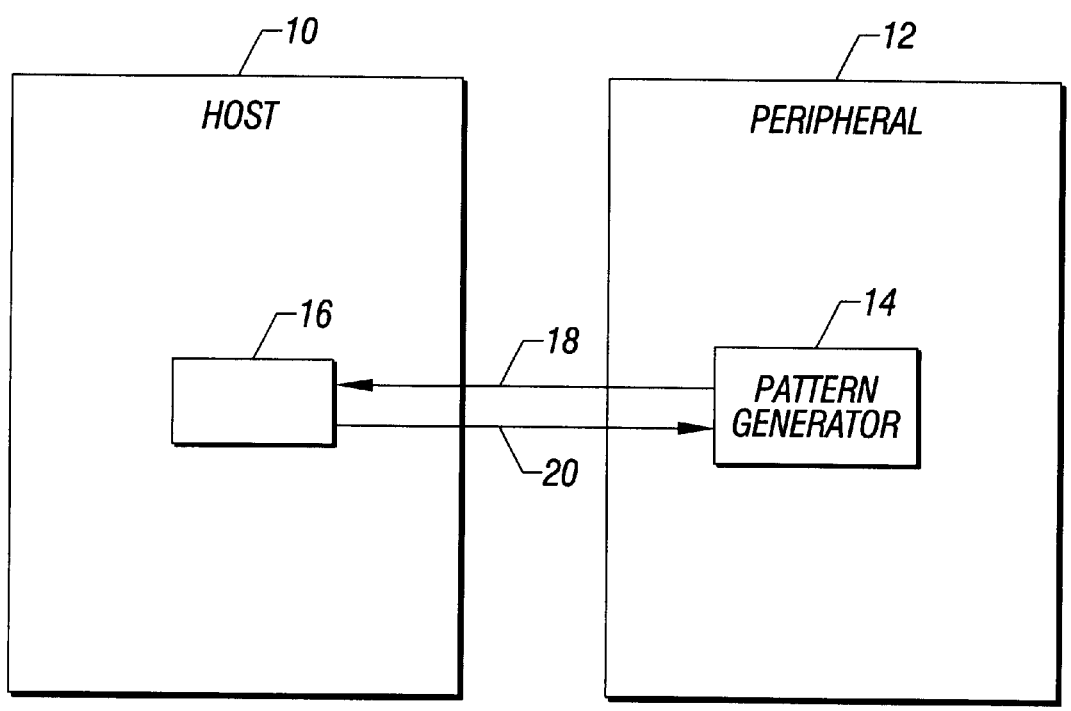
FIG. 1 is a depiction of a communication channel between a host and a peripheral in accordance with one embodiment of the present invention.

Referring to FIG. 1, in one embodiment of the invention a serial Integrated Drive Electronics (IDE) or Advanced Technology Attachment (ATA) system (American National Standards Institute (ANSI) X3T10) includes a peripheral 12 and a host 10. Each device 10 or 12 may include a transmit and receive differential path 18 and 20 which may be made up of four conductors in one embodiment of the present invention. Additionally, ground and power lines may be added.

Initially, a pattern generator 14 in the peripheral 12 develops a predetermined data pattern which is transmitted to a detector 16 on the host 10. If the detector 16 is able to recognize the pattern, it sends an acknowledgement signal 20 to the pattern generator 14. If the host 10 is unable to recognize the signal, it may advise the pattern generator 14 in a variety of ways including sending a signal or by the absence of a responsive signal.

The pattern generator 14 may then provide the same predetermined pattern but at a lower data rate and the peripheral 12 awaits a response. The pattern generator 14 may cycle through progressively lower data rates until the optimal data rate for given current environment is identified.

Figure 3:
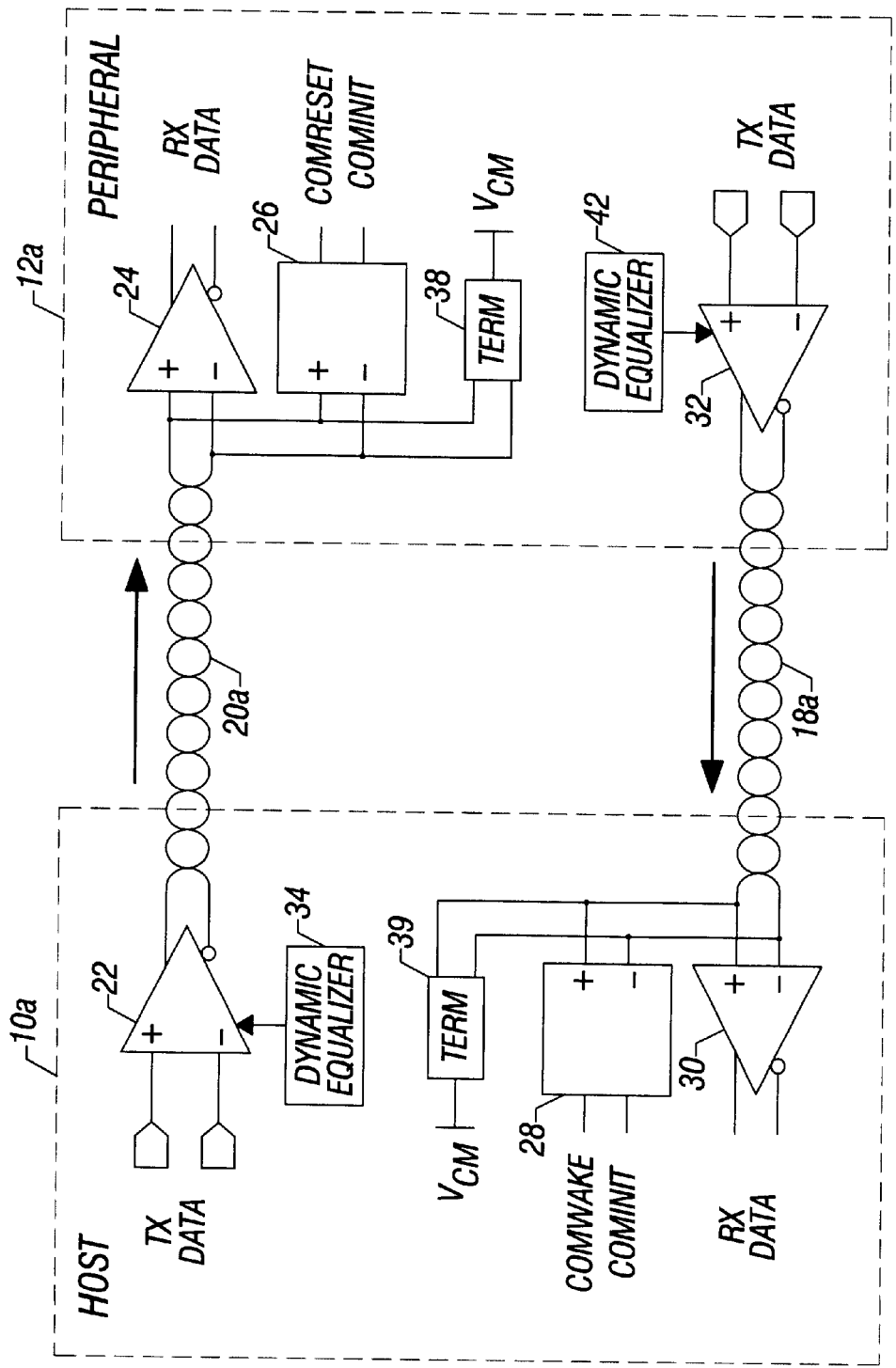
FIG. 3 shows a more detailed depiction of a host and peripheral in accordance with one embodiment of the present invention.

Referring next to FIG. 3, a serial interface between a host 10a and a peripheral 12a may include a set of two differential lines 18a, 20a each driven from one side and received at the opposite side. In an embodiment in which eight bits are encoded in a ten bit word (8B10B), the transmit data (TX DATA) may be serially encoded ten bit data attached to an impedance matched, high speed serial differential line driver 22 or 32. The receive data (RX DATA) may be serially encoded ten bit data attached to a high speed serial differential line receiver 24 or 30.

The term 38, 39 provides proper termination of the serial interface at the receiver end. $V_{CM}$ represents a derived common mode voltage to assist in the termination of the serial lines. Communication reset or ComReset is a signal derived from the receiver that detects a special condition on serial lines causing a general reset. Communication initiation or ComInit is a signal derived from a receiver that detects a special condition on the serial lines used to trigger special processing on the host. Communication wake or ComWake is a signal derived from a receiver that detects a special condition on the signal lines and is used to trigger special processing on either the host or the device. The host 10a may employ an on-chip adaptive matching circuit to ensure the best possible termination for both the transmit and receive devices. The peripheral 12a has the opportunity to employ such a scheme if its manufacturing tolerances necessitate it.

Figure 2:
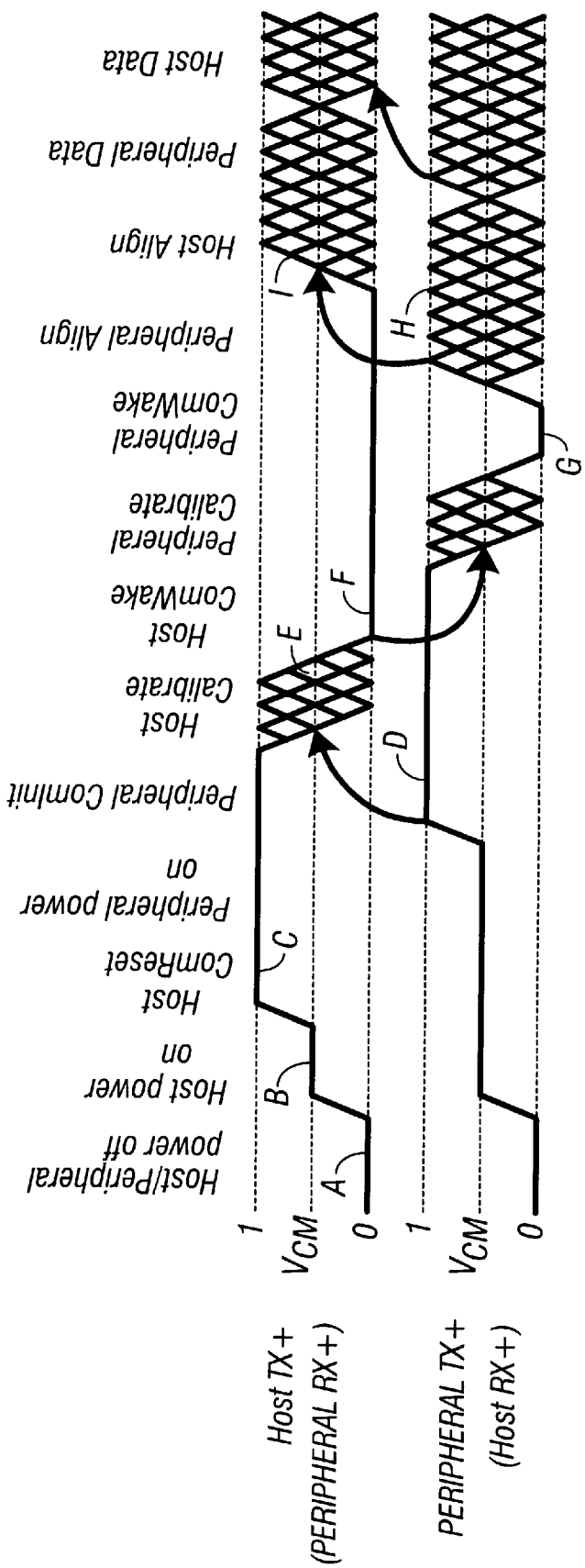
FIG. 2 shows the communication protocol signals that may be utilized in accordance with one embodiment of the type shown in FIG. 1.

Referring to FIG. 2, there are three out-of-band signals in one embodiment of the invention. An out-of-band signal is one that is sent by a different means than a normal communication and, therefore, can never be mistaken for data or vice-versa. The first, ComReset, originates from the host and forces a hard reset on the peripheral, as indicated by the host transmitting a binary "one" level for a predetermined time such as one microsecond. Since 8B10B encoding guarantees that there will never be more then five consecutive 1's (or 0's) this long string of 1's is easily distinguished from data. The second out-of-band signal, ComInit, always originates from the peripheral and requests a communication initialization. It is indicated by the peripheral's transmission of a binary "one" level for at least one microsecond. The last out-of-band signal, ComWake, may originate from either the host or the peripheral and is indicated by transmitting a binary "zero" state for at least one microsecond.

A hard reset may be achieved by the host holding its transmit lines at the one logical state for the duration of a reset pulse (at least 1 microsecond by the current ATA specification). The peripheral may use a low pass filter to distinguish between data and the reset pulse. Any string of logical ones less than one hundred nanoseconds long following a DC balance state does not result in a reset. Any string of ones longer than one microsecond always results in a reset in one embodiment of the invention. A device acknowledges the receipt of a reset signal by transmitting the ComInit signal.

An align pattern, such as 1100000101 0011111010 in one embodiment of the invention, may be used by the peripheral to signal a communications data rate. There are many patterns that would work as the align pattern, but this pattern (known as the K28.5 control character in the 8B10B encoding scheme), was chosen in this implementation for at least three reasons. First, it has good frequency representation. It contains both the lowest frequency component (five 1's in a row) and the highest frequency component (alternating 1010 pattern). This is useful when establishing the highest possible operating frequency because any excessive phase or amplitude variation from these frequency components will be detected during speed negotiation and a lower speed may be selected if necessary at this point. The second reason this character was chosen was its immunity to false detecting as a result of aliasing when the receiver is sampling at a legacy rate. A third reason for choosing this pattern is it is the typical pattern used by existing physical layers to accomplish bit alignment. This pattern is guaranteed to never appear in the data stream at any alignment so a physical layer looks for this pattern to determine the location of each bit in the 10 bit character.

The sequence from power on through communications begins with both the host and the peripheral in a power off state as shown at "A" in FIG. 2. Host side signal conditioning may pull the host transmit and receive pairs to ground when power is off. In this state, both the TX+ and TX− conductors may be at the ground potential. When the host power is on as indicated at B, the host side signal conditioning pulls the transmit and receive pairs to a neutral state called the common mode voltage ($V_{CM}$). The peripheral transmit driver or receive driver are at high impedance. Following power on, the power-on reset causes the host to assert the ComReset state on its transmit pair as indicated at C.

Next, the peripheral powers on and pulls its transmit pair to the ComInit state as indicated at D. The host responds once the host side power-on reset is deasserted. The host looks for the presence of the ComInit signal on its receive pair. If absent, the port is placed in the idle state and no further activity may occur. If ComInit is present, the host continues with the communications sequence by calibrating its transmitter (as indicated at E) and then asserting the ComWake condition on its transmit pair as indicated at F.

The peripheral, detecting ComWake on its receive pair, may calibrate its TX and RX termination if necessary. When complete, it sends a ComWake (indicated at G) followed by an align sequence as indicated at H. The host locks to the align sequence and then, when ready, returns the align sequence to the peripheral at the same rate as it was received, as indicated at I. If the align from the peripheral is at an unsupported rate, the host holds the ComWake state on its transmit pair (prolonging the state indicated by H). Eventually the peripheral will time out and try a lower speed if available. Once the host detects an align at a supported speed, it deasserts ComWake and the sequence progresses to the next state indicated at I.

The peripheral then locks to the align sequence and when ready sends the SYNC primitive indicating it is ready to begin the login procedure. Upon receipt of the SYNC primitive, the communication link is established and the login procedure may begin.

To support the use of legacy devices on a state-of-the-art host platform, the host will sense the align pattern at multiple data rates and reduce its clock if necessary. For example, should the device be operating at half the host rate, the host would see the align pattern stretched out (i.e. 11110000000000110011 . . . ). If the host detects this, it switches to a half-speed mode by either discarding every other bit or reducing its sample rate.

Figure 4:
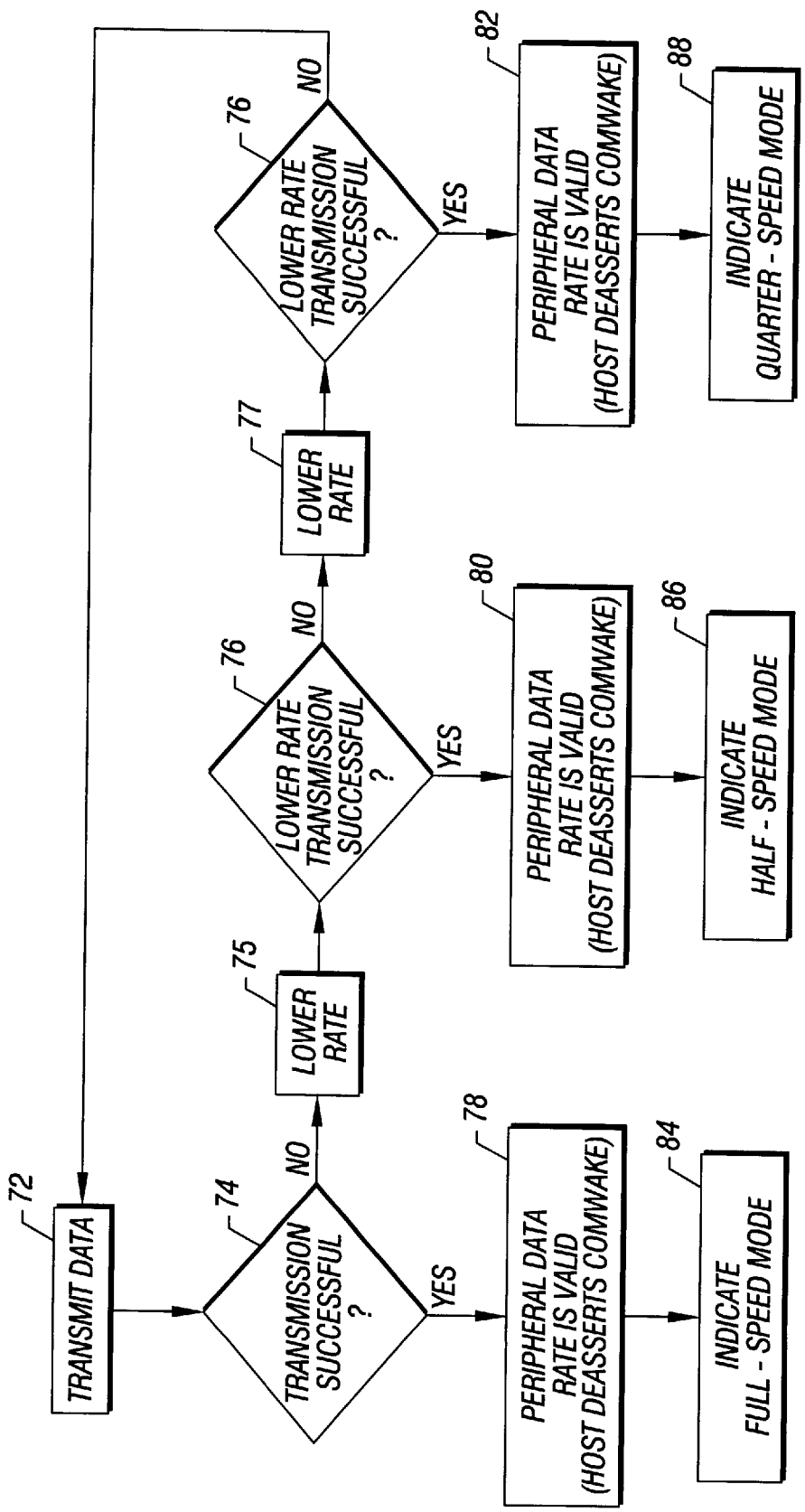
FIG. 4 is a flow chart for software which may be resident on the peripheral for enabling the establishment of a communication channel with the host.

Referring next to FIG. 4, initially an align data pattern is transmitted to the host (unit 16) at the highest data rate. If the highest data rate is successfully received as indicated in diamond 74, the peripheral is signaled that the data rate is valid as indicated in block 78. The peripheral then indicates full speed mode (block 84). If not, the data rate is lowered (block 75). If the lower data rate is successfully received (diamond 76), the peripheral signals that the lower data rate is valid and indicates a half speed mode as indicated in blocks 80 and 86. Otherwise, the data rate is again lower as indicated in diamond 77. If the data is successfully received (diamond 76), the quarter speed mode is selected as indicated in blocks 82 and 88. Otherwise, the sequence is repeated.

By starting at the highest data rate, before beginning the communication sequence, the system may be able to find the best communication rate given available conditions with the least amount of supporting hardware and the least elapsed time. By arbitrating the data rate each time communications are restarted, the optimal data rate may be found given current environment conditions. For example, a bad connector or noisy link can degrade the current environmental conditions so that the highest possible data rate is no longer applicable.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

transmitting a predetermined data pattern to a receiver at a first data rate;

if the receiver does not recognize the pattern, transmitting the pattern at a second data rate that is lower than the first data rate; and establishing communications by transmitting signals in a format different than the format utilized for communications including transmitting three different voltage levels including a lower level, an intermediate level, and a higher level.

2. The method of claim 1 including initiating a power on sequence by transmitting the intermediate level followed by the higher level.

3. The method of claim 2 including transitioning from the intermediate level to the higher level in response to receipt of a signal that transitions from the lower level to the higher level.

4. The method of claim 3 including transmitting a calibration sequence in response to the receipt of the higher level.

5. The method of claim 4 including transmitting the lower level followed by a calibration sequence.

6. The method of claim 5 including transmitting the lower level after transmitting a calibration sequence after receiving the lower level.

7. The method of claim 1 including receiving said data pattern and returning said data pattern at the same rate as the pattern was received.

8. The method of claim 7, wherein if a received data pattern is not recognized, transmitting a characteristic voltage level.

9. The method of claim 8 including waiting for a receiver to transition from the low level for a predetermined time, and after the time is expired, transmitting a pattern at a second data rate that is lower than the first data rate.

10. A method comprising:

receiving a predetermined data pattern at a first data rate;

determining whether the pattern is recognized; and if the pattern is not recognized, requesting that the pattern be retransmitted at a second data rate that is lower than the first data rate and providing an out of band signal that is sent by a different means than a normal transmission transmitting a characteristic voltage level.

11. The method of claim 10 including receiving said data pattern and returning said data pattern at the same rate as the pattern was received.

12. A method comprising:

transmitting a predetermined data pattern to a receiver at a first data rate;

if the receiver does not recognize the pattern, transmitting the pattern at a second data rate that is lower than the first data rate;

establishing communications by transmitting three different voltage levels including a lower level, an intermediate level, and a higher level; and initiating a power on sequence by transmitting the intermediate level followed by the higher level.

13. The method of claim 12 including transitioning from the intermediate level to the higher level in response to receipt of a signal that transitions from the lower level to the higher level.

14. The method of claim 13 including transmitting a calibration sequence in response to the receipt of the higher level.

15. The method of claim 14 including transmitting the lower level followed by a calibration sequence.

16. The method of claim 15 including transmitting the lower level after transmitting a calibration sequence after receiving the lower level.

* * * * *